(12) United States Patent
Muhl et al.

(10) Patent No.: US 8,633,621 B2
(45) Date of Patent: Jan. 21, 2014

(54) ELECTRIC MOTOR FOR DRIVING A MOTOR VEHICLE COMPONENT

(75) Inventors: Ralf Muhl, Berlin (DE); Ulrich Noack, Berlin (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 13/591,420

(22) Filed: Aug. 22, 2012

(65) Prior Publication Data

US 2013/0200758 A1 Aug. 8, 2013

Related U.S. Application Data

(63) Continuation of application No. PCT/EP2011/000231, filed on Jan. 20, 2011.

(30) Foreign Application Priority Data

Feb. 23, 2010 (DE) ...................... 20 2010 002 664 U

(51) Int. Cl.
*H02K 11/00* (2006.01)

(52) U.S. Cl.
USPC .............................. 310/68 C; 310/71; 310/51

(58) Field of Classification Search
USPC ............. 310/42, 68 C, 68 R, 71, 51, 219, 231
See application file for complete search history.

(56) References Cited

U.S. PATENT DOCUMENTS

| | | | |
|---|---|---|---|
| 4,340,831 A * | 7/1982 | Kuhlmann et al. | 310/239 |
| 5,877,569 A * | 3/1999 | Heinrich et al. | 310/68 R |
| 5,949,173 A * | 9/1999 | Wille et al. | 310/220 |
| 6,028,381 A * | 2/2000 | Yumiyama et al. | 310/68 C |
| 6,791,218 B1 * | 9/2004 | Dragoi et al. | 310/68 B |
| 7,696,665 B2 | 4/2010 | Cavallo et al. | |
| 2002/0093259 A1 | 7/2002 | Sunaga et al. | |
| 2004/0061411 A1 * | 4/2004 | Tyshchuk et al. | 310/239 |
| 2008/0174201 A1 | 7/2008 | Cavallo et al. | |

FOREIGN PATENT DOCUMENTS

| | | |
|---|---|---|
| DE | 20 2008 000 975 U1 | 4/2008 |
| DE | 10 2007 011 548 A1 | 9/2008 |
| DE | 10 2007 025 345 A1 | 12/2008 |
| WO | 2005/077017 A2 | 8/2005 |
| WO | 2008/025342 A1 | 3/2008 |

OTHER PUBLICATIONS

International Search Report of PCT/EP2011/000231.

\* cited by examiner

*Primary Examiner* — Thanh Lam
(74) *Attorney, Agent, or Firm* — Laurence A. Greenberg; Werner H. Stemer; Ralph E. Locher

(57) ABSTRACT

An electric motor for driving a motor vehicle component, in particular a fan motor for chilling cooling water, contains a rotor that includes a commutator, against which a brush rests in a contacting manner. A plastic-sheathed pressed screen for forming a current path that is embossed in an electric insulation is connected to the brush. The current path conducting a motor current is interrupted to form two spaced-apart current path ends. An interruption point is bridged by a contact spring that is used as a temperature fuse and consists of two spring legs, each of which has a fixing end and a free end. Each fixing end of the spring legs is connected to a current path end, while the free ends thereof are in contact with each other using a soldered connection so as to bias the spring.

13 Claims, 5 Drawing Sheets

ELECTRIC MOTOR FOR DRIVING A MOTOR VEHICLE COMPONENT

CROSS-REFERENCE TO RELATED APPLICATION

This is a continuation application, under 35 U.S.C. §120, of copending international application No. PCT/EP2011/000231, filed Jan. 20, 2011, which designated the United States; this application also claims the priority, under 35 U.S.C. §119, of German patent application No. DE 20 2010 002 664.4, filed Feb. 23, 2010; the prior applications are herewith incorporated by reference in their entireties

BACKGROUND OF THE INVENTION

Field of the Invention

The invention relates to an electric motor for driving a motor vehicle component, with a rotor having a rotor winding, which is connected to a commutator, against which a brush bears in a contact-making fashion, and with a thermal release. An electric motor is in this case understood in particular to mean a DC fan motor for coolant cooling in a motor vehicle.

Published, non-prosecuted German patent application DE 10 2007 011 548 A1 discloses an adjustment system for a motor vehicle, such as a window winder, a seat adjustment mechanism or a door or sliding roof drive, for example, the adjustment system being operated by an electric motor and having drive electronics for controlling the electric motor taking into consideration an anti-trap protection mechanism. In addition to software-based thermal protection, a thermal release element in the form of a spring element as overload protection is held in a conductor track section leading to the electric motor between two solder points. In the event of an overload current flowing over a determined time, the solder at one of the solder points is fused, with the result that, as a consequence of the spring prestress of the spring element, the conductor track is spontaneously interrupted. This thermal release can be in the form of a prestressed spring element of the helical spring type, in the form of a leaf spring or in the form of a cross-sectional constriction in the manner of an expanding wire cutoff.

German patent DE 10 2007 025 345 B4 discloses the use, in a DC fan motor of a motor vehicle, of a thermal protection element in the form of a thermal cut-off (TCO) element, of a fusible link or a bimetallic-element switch in conjunction with a lead frame encapsulated by plastic injection molding, the lead frame being arranged between a DC voltage supply terminal and control electronics and being coupled thermally thereto. If the temperature of the control electronics exceeds a predetermined threshold value, the thermal protection element trips and interrupts the electrical connection between the DC voltage supply terminal and the control electronics.

The known thermal protection elements are configured first for electronically controlled electric motors and second for only a low current-carrying capacity and a relatively small temperature working range up to approximately 80° C.

SUMMARY OF THE INVENTION

The invention is based on the problem of specifying an electric motor, in particular a DC fan motor for a motor vehicle, with thermal protection, which provides the possibility of use even at a temperature of up to 120° C., for example, and current intensities above 20 A.

In addition, the electric motor, which is operated in particular without the use of electronics and in only one direction of rotation, has a leadframe, encapsulated by plastic injection molding, for forming a current path embossed in electrical insulation. The current path is connected to at least one brush, which bears against a rotor-side commutator of the electric motor in contact-making fashion. The current path conducting the motor current is interrupted so as to form two current path ends that are spaced apart from one another, the interruption point thus produced being bridged by a contact spring as thermal release.

The contact spring can be formed in one or two parts, wherein in particular in the case of the single-part embodiment, the contact spring consists of copper beryllium, i.e. a copper bronze (CuBe or CuCoBe) with beryllium as alloy constituent.

In the case of the two-part embodiment, the contact spring has two spring arms, each having a fixing end and a spring free end. While the fixing ends of the spring arms are electrically conductively connected to in each case one current path end of the current path conducting the motor current, the spring free ends of the contact spring have been brought into contact with one another via a soldered joint under spring prestress.

The contact spring which preferably consists of copper beryllium both in the case of the single-part embodiment and in the case of the two-part embodiment is suitably coated with an electrolytic barrier layer, preferably with nickel. The contact spring which is coated in this way and consists of copper beryllium is suitably additionally tin-plated.

The single-part embodiment of the contact spring is advantageous in terms of simple production, while the double-spring variant, owing to the low tolerances of the soldered joint, is optimally definable and particularly simply adaptable to different current intensities.

In the two-part embodiment of the contact spring (double-spring variant), preferably only one of the spring arms is bent back and thus forms at least one, preferably two bending points which are spaced apart from one another. The bending depressions of the bending points face away from the other spring arm, with the result that, during production of the soldered joint, the bent or bent-back spring arm is curved outwards between the bending points and thus produces the spring prestress of the contact spring. In this case, the spring free end of the other spring arm is preferably shaped in the form of a depression in order to accommodate the solder for producing the soldered joint with the spring free end of the spring arm which is bent so as to produce the spring prestress.

The contact spring is held at the current path ends suitably via contact-making snap-action or latching connections. For this purpose, the fixing ends of the contact spring have spaced-apart as well as spring-elastic and doubly bent-back fixing lugs, which are expediently clamped in a form-fitting and/or force-fitting manner at opening edges of corresponding openings in the respective current path end.

In an expedient configuration, a window-like opening is provided in the region of the interruption point of the current path embossed in the electrical insulation, with it being possible for the prestressed spring arm of the contact spring to spring out or pivot out through the window-like opening in the event of a contact opening of the contact spring. In the window region of the interruption point, a bearing point can be formed, at which the corresponding spring free end stops in a defined manner in the event of a contact opening of the contact spring.

The advantages achieved by the invention consist in particular in that, owing to the use of a thermal release in the form of a contact spring consisting of two spring arms in contact with one another, the contact spring bridging an interruption point in a current path conducting the motor current of an electric motor, firstly reliable protection against overcurrents and/or excess temperatures is provided. Secondly, false tripping in the case of permissible excess temperatures or overcurrents is reliably avoided. These advantages are also achieved with a single-part contact spring which consists of copper beryllium or a comparable material and has a surface which is preferably furthermore provided with an electrolytic barrier layer (for example nickel) and then tin-plated.

Such a contact spring as thermal protection is therefore particularly suitable for use in a DC electric motor without control electronics and with only one drive direction (direction of rotation) and therefore in particular for a radiator fan motor of a motor vehicle. Precisely such a fan motor may be the cause of an increased risk of fire, especially since said fan motor, for necessary coolant cooling, may also still be in operation even when the user has already switched off and left the vehicle.

Other features which are considered as characteristic for the invention are set forth in the appended claims.

Although the invention is illustrated and described herein as embodied in an electric motor for driving a motor vehicle component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Mutually corresponding parts have been provided with the same reference symbols in all of the figures.

Figure 1:
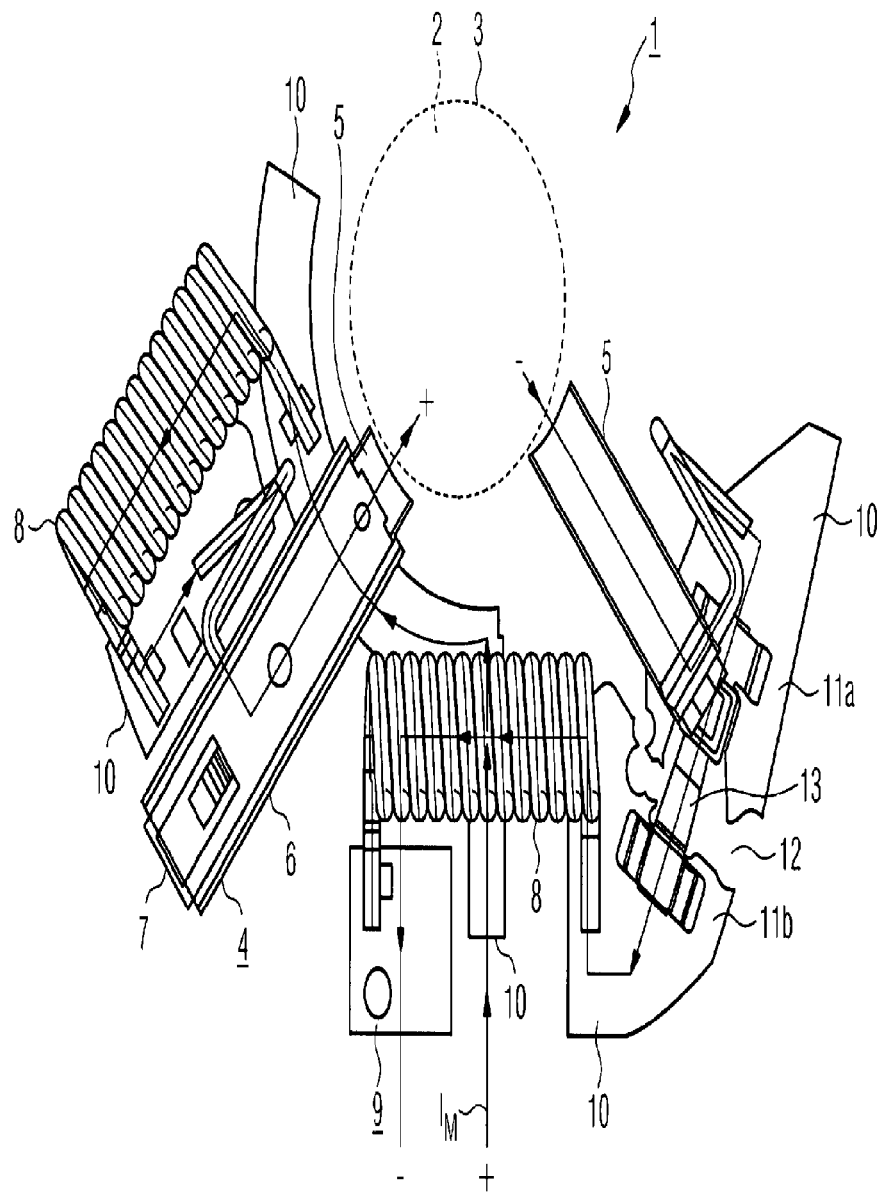
FIG. 1 is a diagrammatic, partial view of a rotor of an electric motor and a brush arrangement in a current path with a contact spring as thermal release according to the invention.

FIG. 1 shows, with the omission of a motor housing and a stator, an electric motor 1 with a rotor 2 with laminations (commutator laminations) of a commutator 3 which are arranged fixed to the rotor and are indicated by dashed lines and with a brush arrangement 4 with two brushes 5 which are arranged offset with respect to one another at the circumference of the rotor 2. As is illustrated in the care of merely one of the brushes 5, the brushes are located in a brush cartridge 6 together with a spring element 7, which presses the respective brush 5 against the commutator 3 under corresponding spring prestress, with the result that the respective brush 5 bears against the commutator 3 or against the commutator laminations thereof in contact-making fashion. The corresponding brush arrangement 4 is illustrated in a perspective view without the rotor 2 in FIG. 2.

The brushes 5 are each connected, via a coil 8, into a current path 9 indicated by the plus sign (+) and minus sign (−) and by the arrow illustration, which current path is closed via the commutator 3 and the non-illustrated coil windings of the rotor 2 and, in a manner not illustrated in any more detail, via the vehicle battery of a motor vehicle or an on-board power supply system thereof. The remaining parts of the current path 9 to which the coils 8 and the brushes 5 are connected are formed by a leadframe 10 encapsulated by plastic injection molding. The current path 9 conducting a motor current $I_M$ is interrupted so as to form two current path ends 11a, 11b that are spaced apart from one another so as to form an interruption point 12. The interruption point 12 is bridged by a contact spring 13 as a thermal release.

As can be seen comparatively clearly from FIGS. 3 to 6, the contact spring 13 consists of two spring arms 13a and 13b, each having a fixing end 14a and 14b and a spring free end 15a and 15b. The fixing ends 14a, 14b of the two spring arms 13, 13b of the contact spring 13 are each connected to one of the two current path ends 11a and 11b. The two spring free ends 15a, 15b of the respective spring arms 13a, 13b are electrically conductively connected to one another via a soldered joint 16 under spring prestress.

In order to produce the spring prestress, in the exemplary embodiment only one of the two spring arms, in this case the spring arm 13a of the contact spring 13, is bent back, preferably at an angle of less than 180° and greater than 90°, so as to form a first bending point 17 close to the associated fixing end 14a and a second bending point 18 which is spaced apart along the spring free end 15a. The bending depressions 19 and 20 thus formed face away from the other spring arm 13b, as can be seen in particular from FIG. 6.

Figure 5:
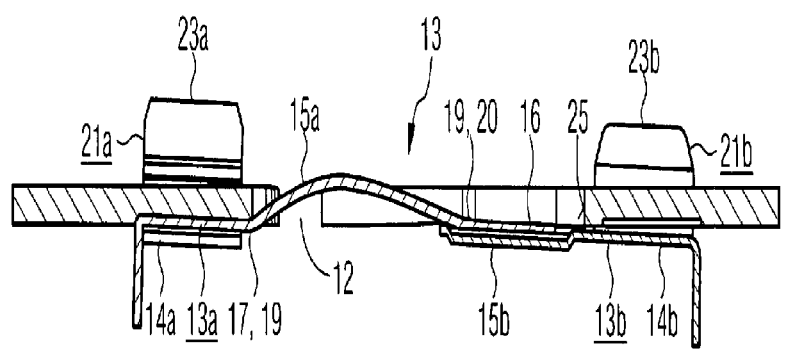
FIG. 5 is a sectional view taken along the line V-V shown in FIG. 3 with spring arms of the contact spring which have been brought into contact with one another under spring prestress.

As can be seen comparatively clearly in FIG. 5, the spring arm 13a is curved out or in, depending on the viewing direction, in the region of the interruption point 12 in the contact-making soldered joint 16 of the two spring arms 13a, 13b, with the result that the spring free ends 15a, 15b of the contact spring 13 have are in contact with one another under spring prestress. In this case, the spring free end 15b of the spring arm 13b which has not been bent back in the exemplary embodiment so as to produce the spring prestress is shaped in the form of a depression in order to accommodate in a defined manner the solder for producing the soldered joint 16 with the spring free end 15a of the spring arm 13a which is bent so as to produce the spring prestress.

Figure 3:
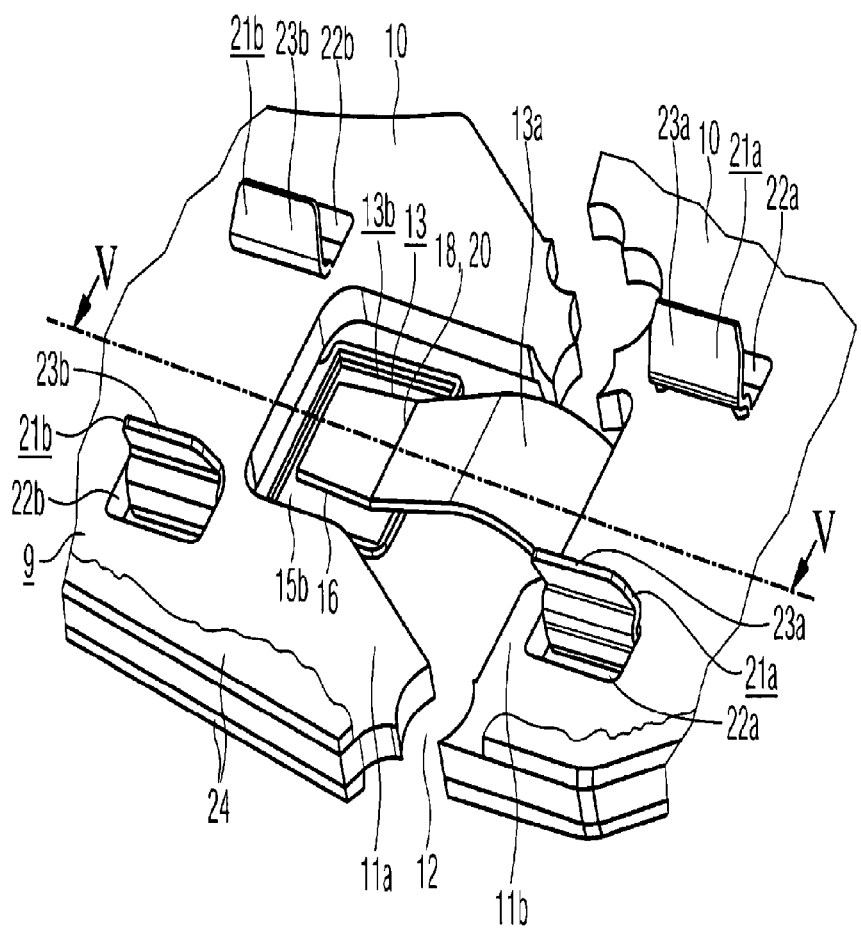
FIG. 3 is a perspective view of a detail from FIGS. 1 and 2, on an enlarged scale and in a view from below, showing the contact spring at an interruption point of the current path.
Figure 4:
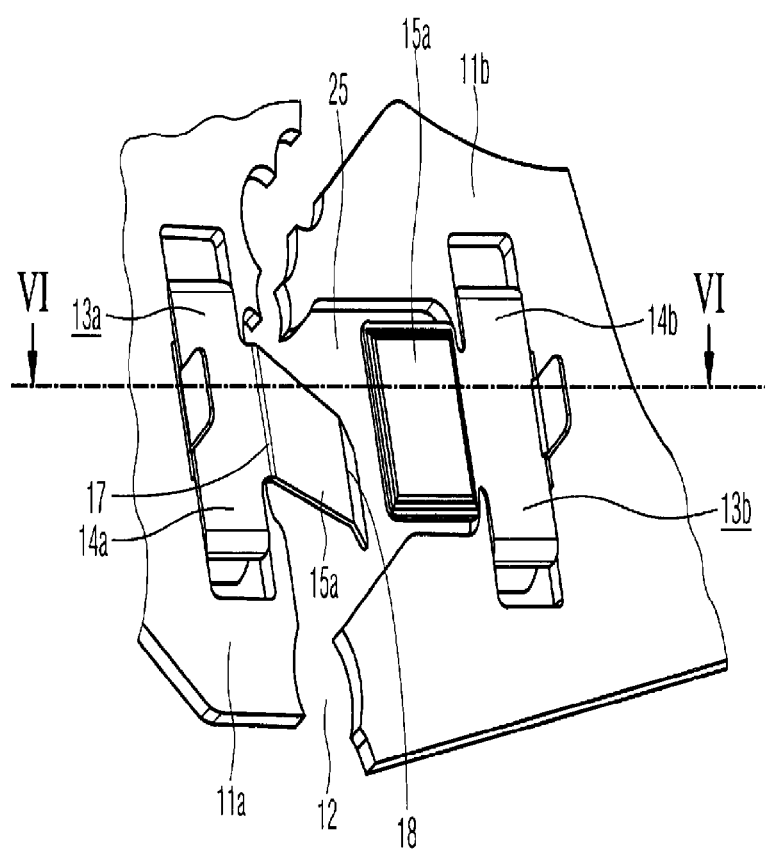
FIG. 4 is a perspective view, as in per FIG. 3, of the contact spring in a tripped state.

As can be seen comparatively clearly from FIGS. 3 and 4, the fixing ends 14a and 14b of the spring arms 13a, 13b of the contact spring 13, the fixing ends being connected to the current path ends 11a, 11b, are each provided with two fixing lugs 21a, 21b which are spaced apart from one another. The fixing lugs pass through corresponding openings 22a, 22b in the respective current path ends 11a and 11b of the interrupted lead frame 10 and are held there in the manner of a snap-action or latching connection. For this purpose, the fixing lugs 21a, 21b are bent back twice and are provided in each case with an angled and plug-in tongue 23a and 23b as insertion aid. The spring-elastic fixing ends 14a, 14b are thus clamped in such a manner as to make contact with the current path ends 11a, 11b and expediently in a form-fitting and/or force-fitting manner at the opening edges of the openings 22a, 22b in the respective current path end 11a or 11b.

Figure 6:
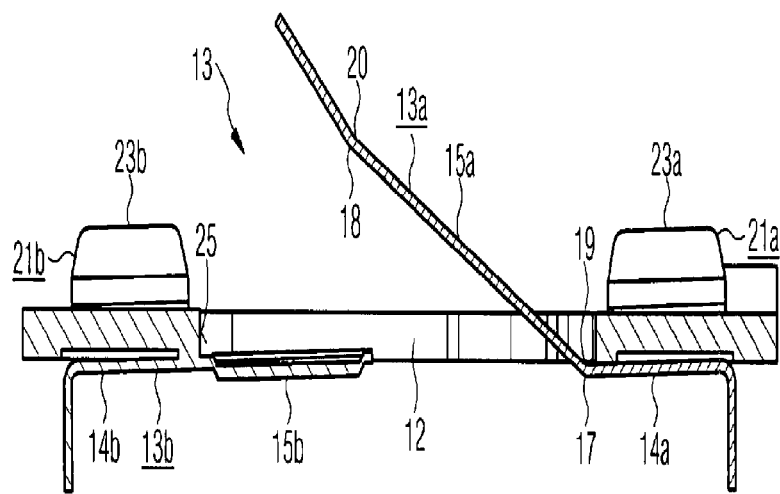
FIG. 6 is a sectional view, rotated through 180° with respect to FIG. 5, taken along the lines VI-VI shown in FIG. 5, of the contact spring in the tripped state.

As indicated in FIG. 3, the lead frame 10 is encapsulated by injection molding with a plastic layer as electrical insulation 24 so as to form the current path 9 embossed in electrical insulation. A window opening 25 is provided in the region of the interruption point 12 of the current path 9 embossed in the electrical insulation 24, with it being possible for the prestressed spring free end 15a to spring out of the window opening in the event of the contact opening of the contact spring 13 as illustrated in FIGS. 4 and 6.

The contact spring 13 preferably consists of copper beryllium. The contact spring 13 is also coated with an electrolytic barrier layer, in particular with nickel, and is then tin-plated. When using copper beryllium as spring material of the contact spring 13 and the additional coating, owing to the high current-carrying capacity and thermal resistance made possible thereby, a single-part contact spring 13 can also be provided. One fixing end of the contact spring is then connected to one current path end, for example in turn with a snap-action connection or the like, while the spring free end has been brought into contact with the other current path end while bridging the interruption point 12 of the current path 9, for example, in turn via a soldered joint.

Such a contact spring 13 as thermal protection is particularly suitable for use in a DC electric motor without control electronics and with only one drive direction (direction of rotation) and therefore in particular for a radiator fan motor of a motor vehicle.

The invention claimed is:

1. An electric motor for driving a motor vehicle component, the electrical motor comprising:
a brush;
a rotor having a commutator, against which said brush bears in a contact-making fashion;
a leadframe encapsulated by plastic injection molding, and forming a current path embossed in an electrical insulation, the current path being connected to said brush, said current path conducting a motor current being interrupted so as to form two current path ends that are spaced apart from one another at an interruption point; and
a contact spring bridging said interruption point, said contact spring functioning as a thermal release, said contact spring containing two spring arms, each having a fixing end and a spring free end, said fixing ends of said spring arms being connected to in each case to one said current path ends, and said spring free ends brought into contact with one another via a soldered joint under spring prestress.

2. The electric motor according to claim 1, wherein said contact spring is formed from copper beryllium.

3. The electric motor according to claim 1, wherein one of said two spring arms of said contact spring has at least one bending point, said bending point being a bending depression facing away from the other said spring arm.

4. The electric motor according to claim 1, wherein said spring arm has two bending points which are spaced apart from one another, said bending points each having a bending depression facing away from the other said spring arm.

5. The electric motor according to claim 3, wherein said spring free end of the other said spring arm produces said soldered joint with said spring free end of said spring arm which is bent under spring prestress and is shaped in a form of said bending depression.

6. The electric motor according to claim 1, wherein:
said current path ends having corresponding openings formed therein; and
said fixing ends of said contact spring have fixing lugs which are spaced apart from one another and are guided into said corresponding openings in a respective said current path end so as to produce a snap-action connection.

7. The electric motor according to claim 1, wherein said current path has a window opening formed therein and provided in a region of said interruption point of said current path embossed in said electrical insulation, with a prestressed said spring free end springing out of said window opening in an event of a contact opening of said contact spring.

8. The electric motor according to claim 1, wherein the electric motor is a DC motor for driving a fan motor for coolant cooling.

9. An electric motor for driving a motor vehicle component, the electric motor comprising:
a brush;
a rotor having a commutator, against which said brush bearing in a contact-making fashion;
a leadframe, encapsulated by plastic injection molding, forming a current path embossed in an electrical insulation, said current path being connected to said brush, said current path conducting a motor current being interrupted so as to form two current path ends that are spaced apart from one another and defining an interruption point; and
a contact spring bridging said interruption point and functioning as a thermal release, said contact spring having fixing ends being connected to in each case one of said current path ends, and said contact spring formed from copper beryllium.

10. The electric motor according to claim 9, wherein said contact spring has an electrolytic barrier layer.

11. The electric motor according to claim 10, wherein said contact spring having said electrolytic barrier layer is tin-plated.

12. The electric motor according to claim 9, wherein the electric motor is a DC motor for driving a fan motor for coolant cooling.

13. The electric motor according to claim 10, wherein said electrolytic barrier layer is coated with nickel.

* * * * *

UNITED STATES PATENT AND TRADEMARK OFFICE
CERTIFICATE OF CORRECTION

Page 1 of 4

| | |
|---|---|
| PATENT NO. | : 8,633,621 B2 |
| APPLICATION NO. | : 13/591420 |
| DATED | : January 21, 2014 |
| INVENTOR(S) | : Ralf Muhl et al. |

It is certified that error appears in the above-identified patent and that said Letters Patent is hereby corrected as shown below:

Replace the Title Page with the attached Title Page

In the Drawings:

Fig. 1 should be as follows:

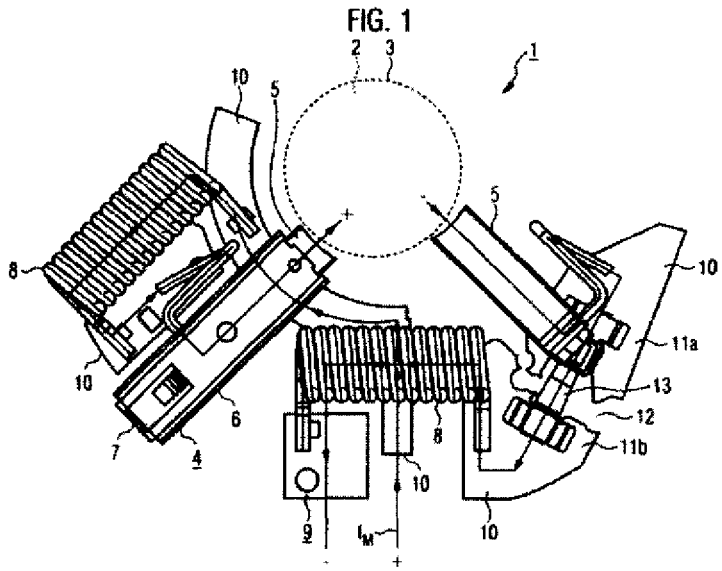

Signed and Sealed this
Twenty-ninth Day of July, 2014

Michelle K. Lee
*Deputy Director of the United States Patent and Trademark Office*

Figure 2:
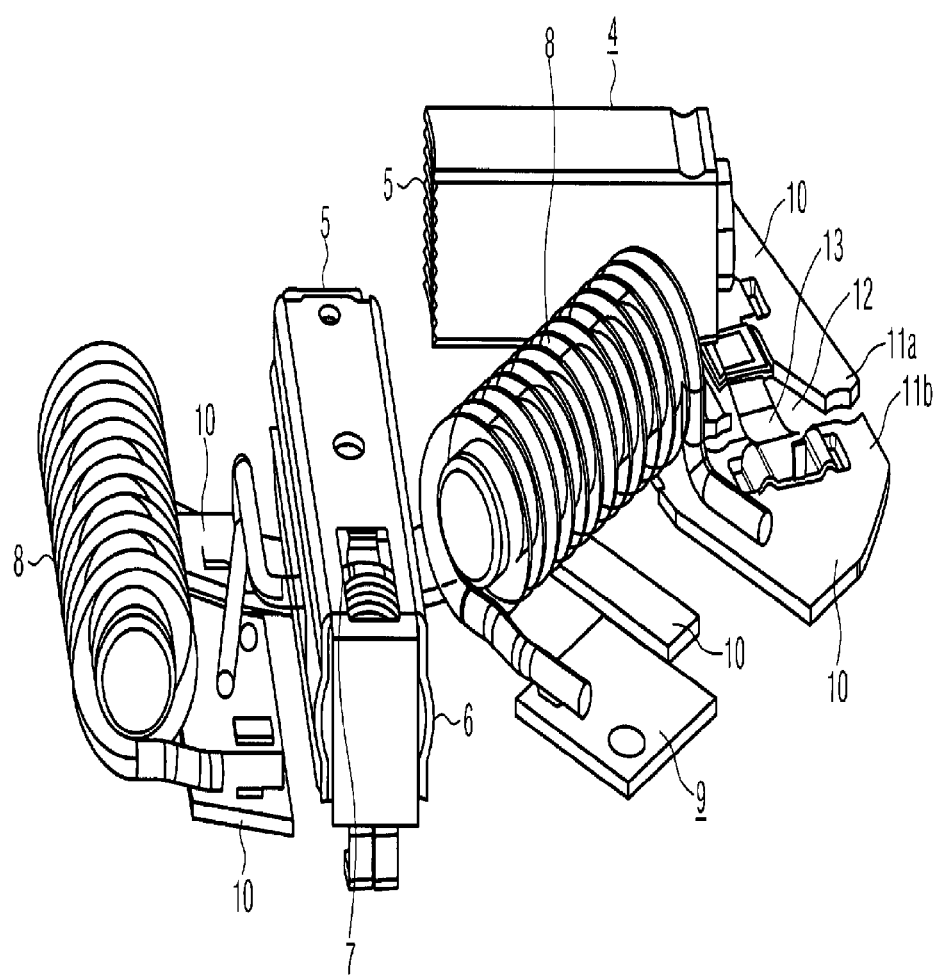
FIG. 2 is a diagrammatic, perspective view of the brush arrangement with the contact spring without the rotor.

Fig. 2 should be as follows:
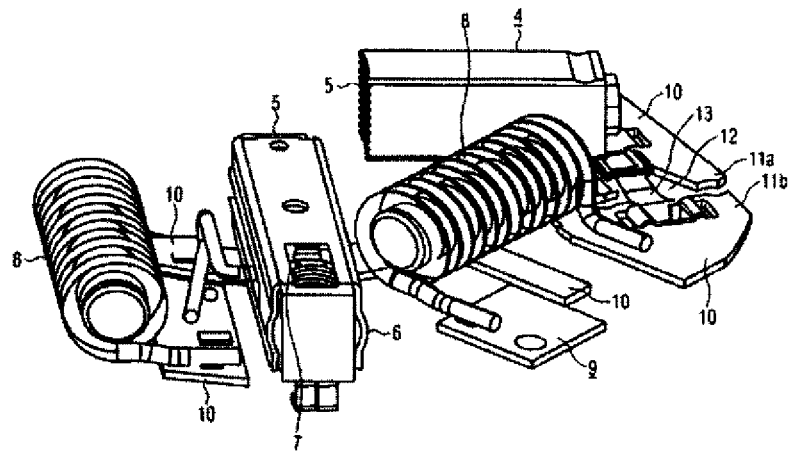
Fig. 3 should be as follows:
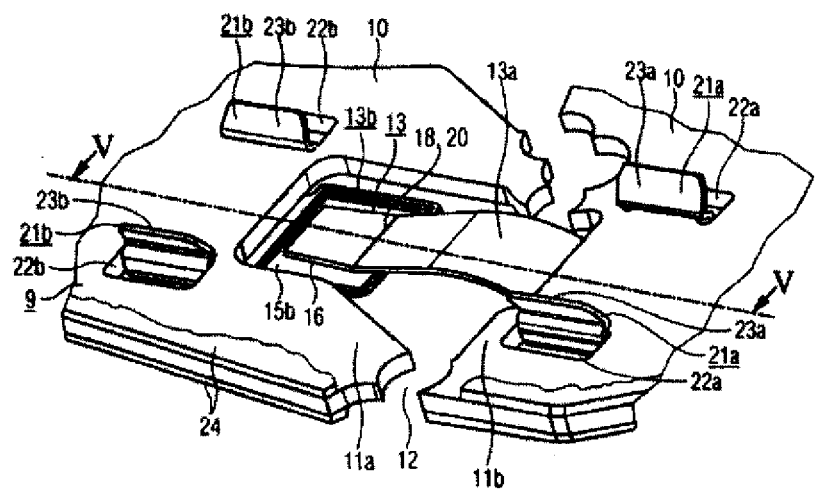

Fig. 4 should be as follows:
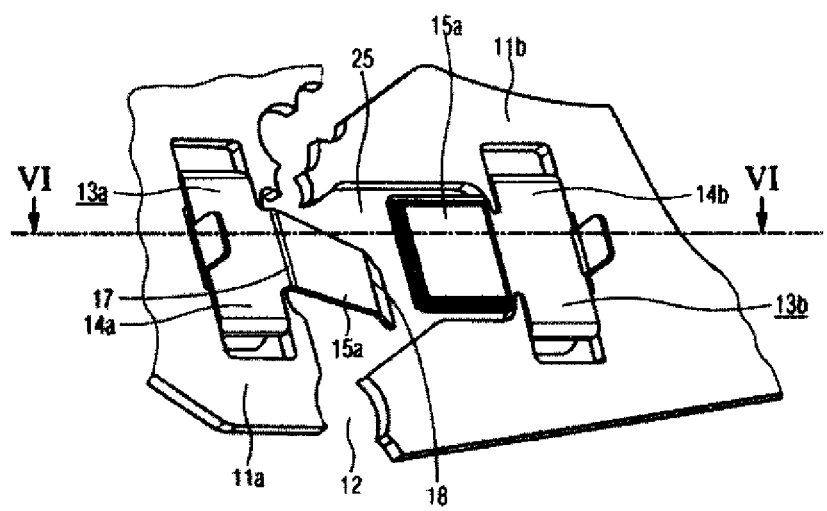
Fig. 5 and 6 should be as follows:
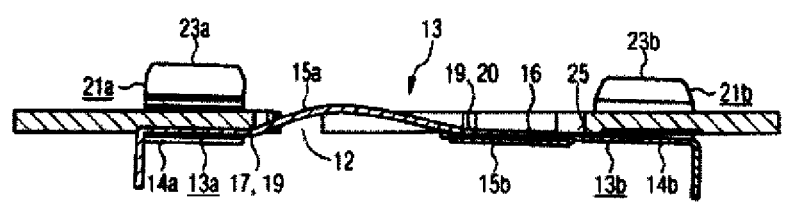
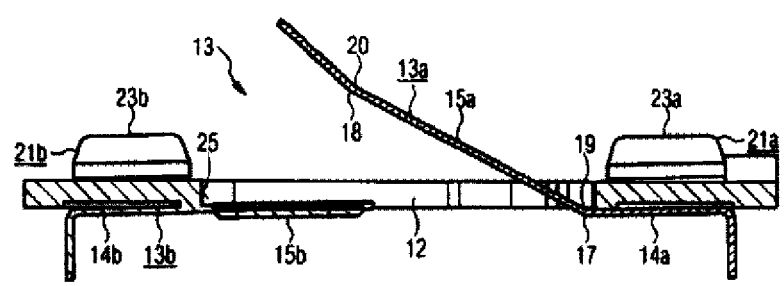

(12) United States Patent
Muhl et al.

(10) Patent No.: US 8,633,621 B2
(45) Date of Patent: Jan. 21, 2014

(54) ELECTRIC MOTOR FOR DRIVING A MOTOR VEHICLE COMPONENT

(75) Inventors: Ralf Muhl, Berlin (DE); Ulrich Noack, Berlin (DE)

(73) Assignee: Brose Fahrzeugteile GmbH & Co. Kommanditgesellschaft, Wuerzburg, Wuerzburg (DE)

( * ) Notice: Subject to any disclaimer, the term of this patent is extended or adjusted under 35 U.S.C. 154(b) by 0 days.

(21) Appl. No.: 13/591,420

(22) Filed: Aug. 22, 2012

(65) Prior Publication Data
US 2013/0200758 A1  Aug. 8, 2013

Related U.S. Application Data

(63) Continuation of application No. PCT/EP2011/000231, filed on Jan. 20, 2011.

(30) Foreign Application Priority Data

Feb. 23, 2010  (DE) .................. 20 2010 002 664 U

(51) Int. Cl.
*H02K 11/00* (2006.01)

(52) U.S. Cl.
USPC ........................... 310/68 C; 310/71; 310/51

(58) Field of Classification Search
USPC ............. 310/42, 68 C, 68 R, 71, 51, 219, 231
See application file for complete search history.

(56) References Cited

U.S. PATENT DOCUMENTS

| | | | |
|---|---|---|---|
| 4,340,831 A * | 7/1982 | Kuhlmann et al. | 310/239 |
| 5,877,569 A * | 3/1999 | Heinrich et al. | 310/68 R |
| 5,949,173 A * | 9/1999 | Wille et al. | 310/220 |
| 6,028,381 A * | 2/2000 | Yumiyama et al. | 310/68 C |
| 6,791,218 B1 * | 9/2004 | Dragoi et al. | 310/68 B |
| 7,696,665 B2 | 4/2010 | Cavallo et al. | |
| 2002/0093259 A1 | 7/2002 | Sunaga et al. | |
| 2004/0061411 A1* | 4/2004 | Tyshchuk et al. | 310/239 |
| 2008/0174201 A1 | 7/2008 | Cavallo et al. | |

FOREIGN PATENT DOCUMENTS

| | | |
|---|---|---|
| DE | 20 2008 000 975 U1 | 4/2008 |
| DE | 10 2007 011 548 A1 | 9/2008 |
| DE | 10 2007 025 345 A1 | 12/2008 |
| WO | 2005/077017 A2 | 8/2005 |
| WO | 2008/025342 A1 | 3/2008 |

OTHER PUBLICATIONS

International Search Report of PCT/EP2011/000231.

* cited by examiner

*Primary Examiner* — Thanh Lam
(74) *Attorney, Agent, or Firm* — Laurence A. Greenberg; Werner H. Stemer; Ralph E. Locher

(57) ABSTRACT

An electric motor for driving a motor vehicle component, in particular a fan motor for chilling cooling water, contains a rotor that includes a commutator, against which a brush rests in a contacting manner. A plastic-sheathed pressed screen for forming a current path that is embossed in an electric insulation is connected to the brush. The current path conducting a motor current is interrupted to form two spaced-apart current path ends. An interruption point is bridged by a contact spring that is used as a temperature fuse and consists of two spring legs, each of which has a fixing end and a free end. Each fixing end of the spring legs is connected to a current path end, while the free ends thereof are in contact with each other using a soldered connection so as to bias the spring.

13 Claims, 5 Drawing Sheets

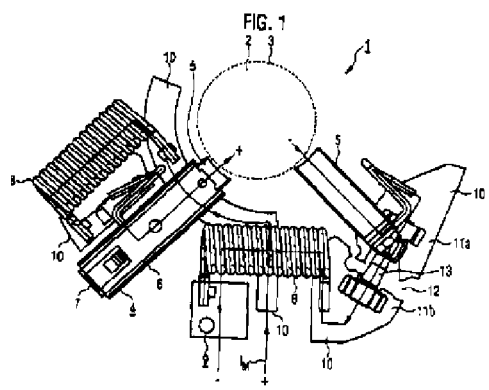

FIG. 1